United States Patent [19]

Nishikawa

[11] Patent Number: 5,603,808

[45] Date of Patent: Feb. 18, 1997

[54] MOLD FOR FORMING PULP MOLDINGS

[75] Inventor: Kazuyuki Nishikawa, Toyohashi, Japan

[73] Assignee: Sintokogio, Ltd., Nagoya, Japan

[21] Appl. No.: 576,951

[22] Filed: Dec. 22, 1995

[30] Foreign Application Priority Data

Dec. 27, 1994 [JP] Japan .................................. 6-339783

[51] Int. Cl.$^6$ .................................. D21J 3/00; B28B 7/40
[52] U.S. Cl. .................... 162/382; 162/411; 425/85; 249/113; 249/114.1; 249/141
[58] Field of Search .................................. 162/382, 396, 162/398, 399, 275, 272, 411, 217, 218; 425/83, 84, 85; 249/113, 114.1, 141

[56] References Cited

U.S. PATENT DOCUMENTS

| | | | |
|---|---|---|---|
| 2,377,864 | 6/1945 | Chaplin | 162/411 X |
| 3,001,582 | 9/1958 | Kindseth et al. | 249/113 |
| 3,216,890 | 11/1965 | Crabtree | 162/227 |
| 3,261,740 | 7/1966 | Wells | 162/390 X |
| 3,284,284 | 11/1966 | Wells | 162/218 |
| 5,399,243 | 3/1995 | Miyamoto et al. | 162/274 |
| 5,431,784 | 7/1995 | Miyamoto et al. | 162/275 |

*Primary Examiner*—Donald E. Czaja
*Assistant Examiner*—Jose A. Fortuna
*Attorney, Agent, or Firm*—Limbach & Limbach

[57] ABSTRACT

A mold is disclosed for producing a pulp molding. The mold includes a reticulate resin mold part (1) of a three-dimensional shape. The resin mold part (1) is metallized for reinforcement and mounted on a support member (3) made of a resin, metal, or aggregate. The support member has substantially the same three-dimensional shape as that of the reticulate resin mold part, and has openings (3A, 3A) to discharge water from the openings (1A, 1A) of the metallized resin mold part (2).

6 Claims, 3 Drawing Sheets

MOLD FOR FORMING PULP MOLDINGS

FIELD OF THE INVENTION

This invention relates to a mold for forming pulp moldings that uses a paper-making method wherein pulp fibers are deposited on a mesh.

DESCRIPTION OF THE PRIOR ART

Recently pulp moldings have become noticeable for being substituted for resin products because of problems caused when the resin products are disposed of.

Trays or packing members for products for domestic use have been produced by vacuum forming using PVC or polystyrene sheets or by expansion molding using polyurethane or polystyrene. When these trays or packing members are burned for disposal in an incinerator, its temperature may become extremely high, thereby shortening the life of the incinerator and causing air pollution and other environmental difficulties, which have developed into social problems.

Thus pulp moldings have become noticeable as an alternative, to eliminate these problems. However, their appearance and formability are inferior to resin moldings. This inferiority comes from the fact that the paper-making method used to form pulp moldings is one wherein a wire mesh with openings of 0.1 μm–2.0 μm is used as a mold for forming a pulp molding, and it is bent, pressed, or manually hammered with hand tools, or wherein a plurality of sections of wire meshes so formed as parts of a mold of a complicated shape are jointed by soldering, etc., thereby greatly restricting the freedom of shaping and resulting in an unsuccessful market.

It has also been proposed to enhance the freedom to form a mold to be produced by this paper-making method wherein an aggregate such as sand, glass beads, or ceramic particles, is bound with a resin binder or is bound by sintering the aggregate, so that water is discharged through tiny voids formed between particles of the aggregate. However, in the mold, tiny particles adhere to the inner walls of the voids, accumulate there, and plug them. These accumulating pulp particles cannot be washed down by reverse water flush. Thus the life of the mold is much shorter than that of the wire-mesh mold, and therefore is unsuitable to produce many pulp moldings.

This invention has been made to overcome this problem. It aims to provide a mold to produce a pulp molding with a great freedom to form the mold and a good appearance, while still using the advantage of the conventional paper-making method which uses a wire mesh or meshes.

Conventionally, laser stereolithography is well-known. By it a resin mold is produced by applying a laser beam to a photo-setting resin and then continuously lowering the hardened resin. If the laser beam is applied to the resin based on three-dimensional data, a resin mold having a surface of a three-dimensional shape is obtained. This technology is used to produce a reticulate resin mold part of the mold of the present invention.

SUMMARY OF THE INVENTION

To produce a mold of the present invention, first a resin mold part is formed of a photo-setting resin by laser stereolithography such that the surface of the resin mold part has a three-dimensional shape, and such that the resin mold part has a reticulate structure with openings of 0.1 mm–2.0 mm. All the surfaces of the reticulate resin mold part are metallized for reinforcement with a metal coating of a thickness of 5–500 μm. The metallized reticulate mold part is then mounted on a support member formed with openings that allow water to pass through them.

In one aspect of the present invention the support member may be a metal or resin body formed with apertures or channels to discharge water.

In another aspect of the present invention the support member may be of a porous structure produced by binding an aggregate of coarse particles, the sizes of which are such that they leave gaps between particles larger than the openings of the reticulate resin mold part, by using a binder or by sintering the aggregate.

As mentioned above, the mold of the present invention can produce a pulp molding by using the advantage of a paper-making mold formed of a wire mesh or meshes (i.e., the mold can be used for a long time without the pulp plugging the mold). Further, the mold of the present invention can be shaped in a complicated figure which is difficult to obtain from a wire mesh or meshes.

DESCRIPTION OF THE PREFERRED EMBODIMENTS

The embodiments of the present invention will now be explained by referring to the accompanying drawings.

Figure 1:
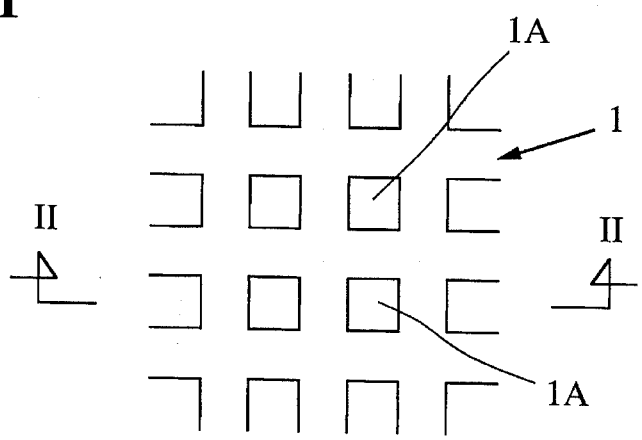
FIG. 1 is an enlarged partial plan view of the resin mold part used in the mold of the invention.
Figure 2:
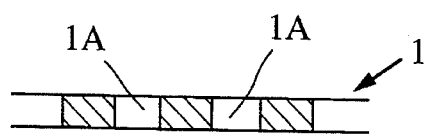
FIG. 2 is a cross-sectional view taken along line II—II in FIG. 1.
Figure 3:
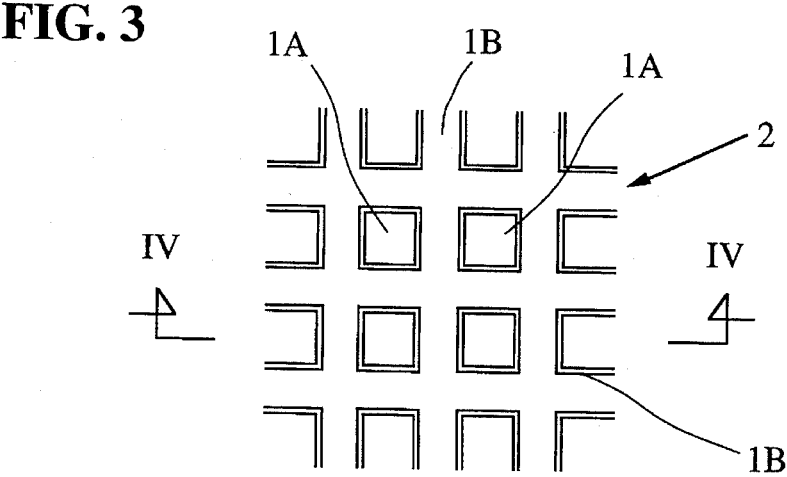
FIG. 3 is an enlarged partial plan view of the reticulate mold part.
Figure 4:
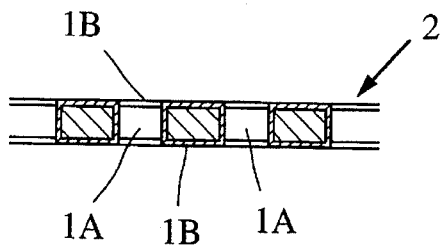
FIG. 4 is a cross-sectional view taken along line IV—IV in FIG. 3.
Figure 5:
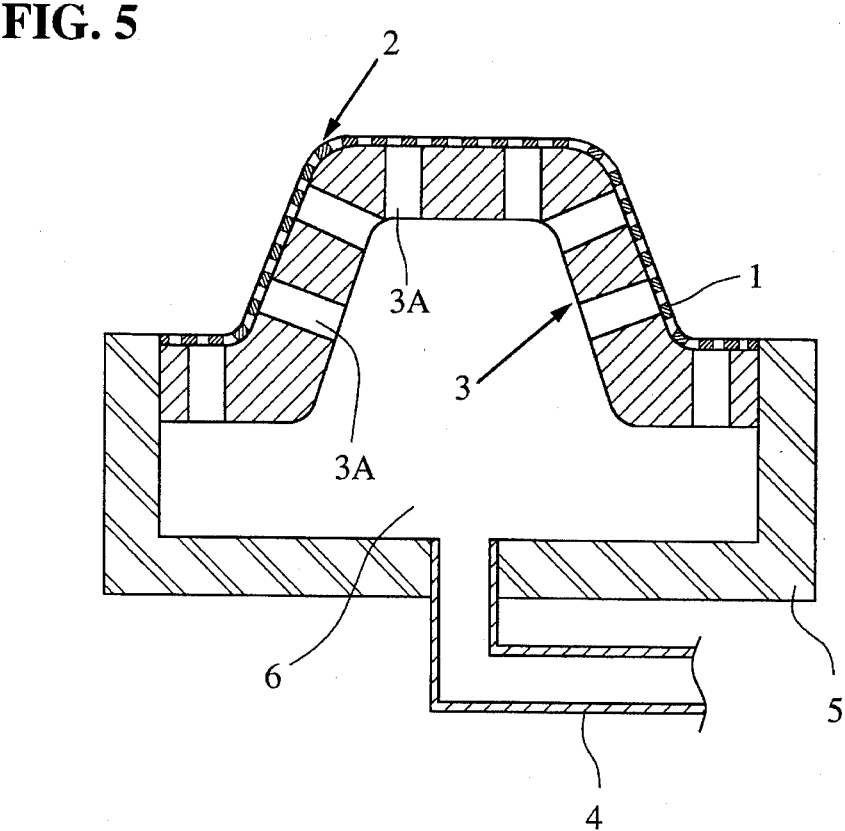
FIG. 5 is a vertical cross-sectional view of an embodiment of the mold of the invention.

FIGS. 1 and 2 show an enlarged part of the reticulate resin mold part 1, which is formed in a three-dimensional shape (see FIG. 5) from a photo-setting resin by conventional laser stereolithography. The resin mold part 1 is formed with a number of openings 1A, 1A therein. The size of each opening 1A of the reticulate resin mold part 1 is 0.1–2.0 min. Since the resin mold part 1 does not have enough strength, it is metallized for reinforcement. That is, all the surfaces of the resin mold part 1 are metallized with a 5–500 μm thick metal coating 1B, as, for example, of nickel, chrome, or copper. FIGS. 3 and 4 show the metallized reticulate resin mold part 2.

The metallized resin mold part 2 is then securely mounted on a support member 3, which has been formed in advance substantially in the same three-dimensional shape as that of the resin mold part 1. Thus a mold for producing a pulp molding is manufactured. In the first embodiment, as in FIG. 5, the support member 3 is made of a resin or metal and is formed with a plurality of openings 3A, 3A therein, which are suitably spaced apart for discharging water. The mold 3 is mounted on an open-top box 5 such that a chamber 6 is defined between the mold 3 and box 5. The openings 3A, 3A are open to the metallized resin mold part 2 and communicate with the chamber 6, which in turn communicates with a vacuum source or compressed-air supply source (not shown) via a duct 4. The duct 4 can be selectively connected to one of the vacuum and compressed-air supply sources.

Figure 6:
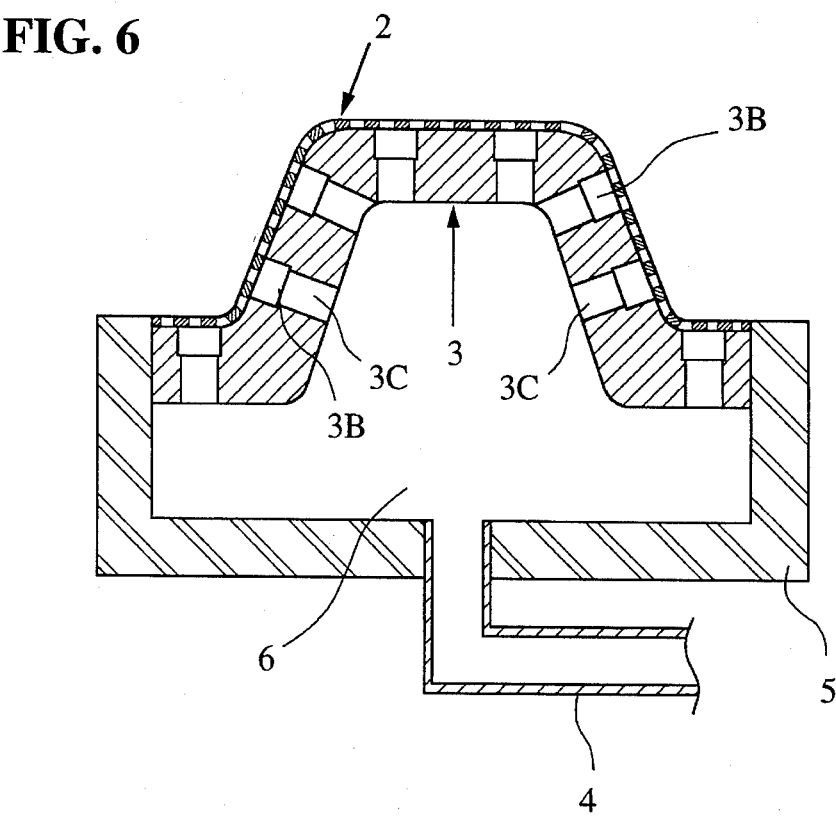
FIG. 6 is a vertical cross-sectional view of a second embodiment of the mold of the invention.

In the second embodiment, as in FIG. 6, the support member 3 of a three-dimensional shape has a plurality of channels, or grooves, 3B, 3B formed in its upper surface. The channels 3B, 3B are open to the metallized resin mold part 2. A plurality of openings 3C, 3C are disposed under each channel 3B. The openings 3C, 3C communicate with the channels 3B, 3B and the chamber 6 to allow water to flow into the channel 3B, 3B, openings 3C, 3C, and then the chamber 6. The support member 3 may be made of metal or a resin.

Figure 7:
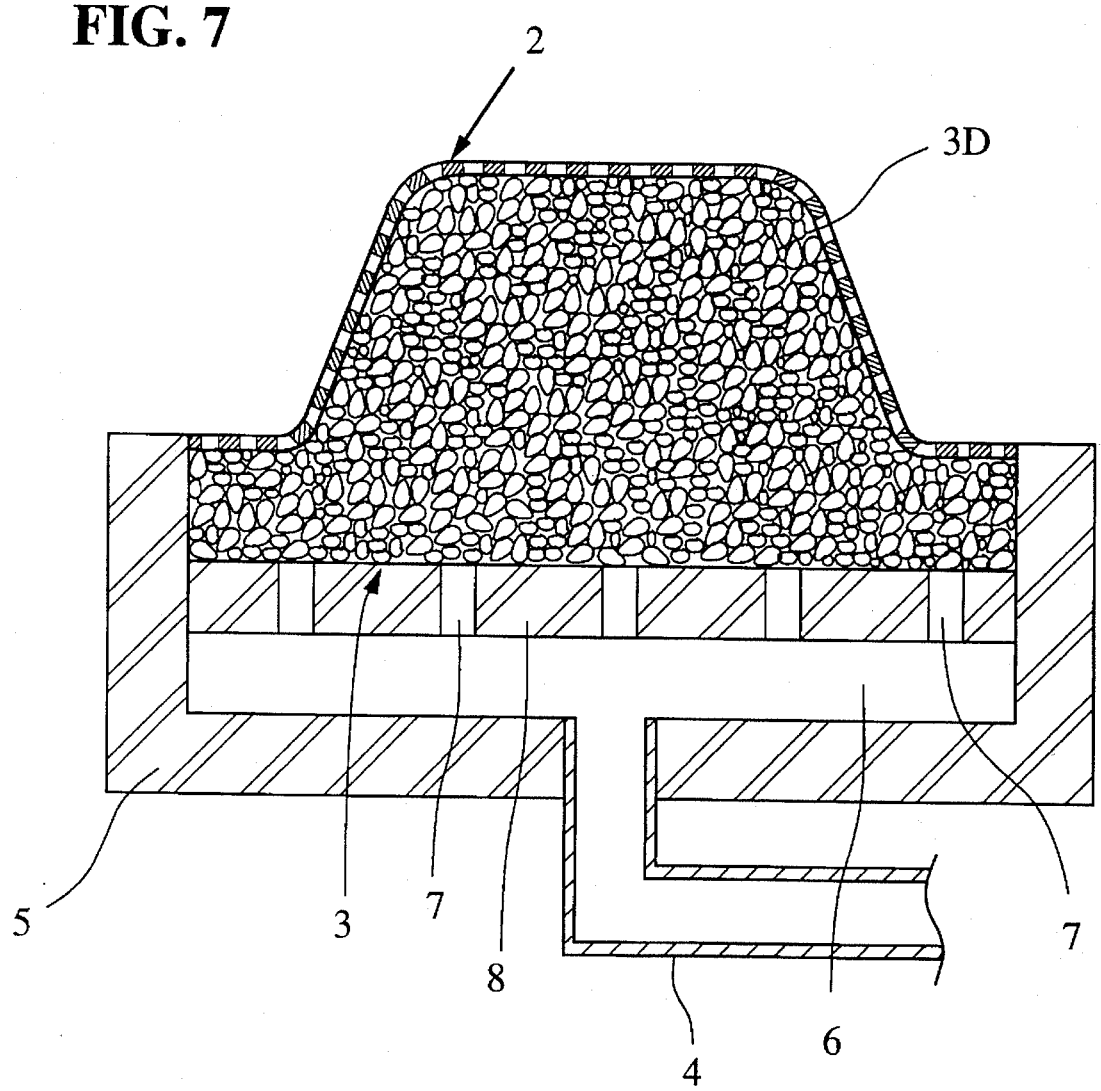
FIG. 7 is a vertical cross-sectional view of a third embodiment of the mold of the invention.

In the third embodiment, as in FIG. 7, the support member 3 has a body of coarse particles bound together to form a porous structure 3D and a support plate 8 to support the porous structure 3D. The mold, comprised of the metallized resin mold part 2, porous structure 3D, and support plate 8, is securely mounted on the open-top box 5, thereby defining the chamber 6 between the mold and box. The support plate 8 is formed with a plurality of apertures 7, 7, which are open to the porous structure 3D and chamber 6. In this embodiment the particles of the porous structure are bound together by a binder or by sintering them such that voids that are larger than the openings 1A, 1A of the resin mold part 1 can be formed between the particles. This structure allows water to flow down into the voids through the apertures 7, 7, and flow into the chamber 6.

The process to produce a pulp molding will now be explained. The mold, comprised of the metallized resin mold part 2 and support member 3, is immersed in a pulp fiber solution. Then the pressure in the chamber 6 is reduced by a vacuum source connected to the pipe 4. Since the resin mold part 2 has openings of 0.1–2.0 mm, the pulp fibers in the solution are captured by the meshes, and only water can pass through it and the apertures 3A, 3A and flow down into the chamber 6, as in FIG. 5. In the second embodiment, as in FIG. 6, the water from the meshes passes along the channels 3B, 3B and then flows into the apertures 3C, 3C and chamber 6. In the third embodiment, as in FIG. 7, the water from the meshes passes through the porous structure 3D and then flows into the apertures 7 and chamber 6. The water is discharged through the pipe 4. During this process pulp fibers accumulate on the metallized resin mold part 2. When a predetermined time passes, the mold is taken out of the solution and sufficiently dewatered, and the pulp molding formed on the resin mold part 2 is blown, to remove it from the resin mold part 2, by the compressed air that flows from the compressed-air supply source (not shown), which is now connected to the pipe 4. If some pulp fibers pass through the openings 1A, 1A, they also pass through the apertures 3A, 3A, as in FIG. 5, channels 3B, 3B and apertures 3C, 3C, as in FIG. 6, or voids of the porous structure 3D and apertures 7, as in FIG. 7, and flow into the chamber 6, since the apertures and channels are larger than the openings 1A, 1A. Thus no plugging occurs.

One skilled in the art will appreciate that besides the described embodiments the present invention can be practiced by any embodiment. The described embodiments are given for illustration and not for limitation, and the present invention is limited only by the following claims:

What we claim is:

1. A mold for producing a pulp molding, comprising a reticulate resin mold part (1) mounted on a support member (3), said resin mold part having a three-dimensional shape, said resin mold part having openings (1A, 1A) of 0.1 mm–2.0 mm, all surfaces of said resin mold part being metallized with a coating 5–500 μm thick, said support member having openings therein that allow water from said resin mold part openings to flow through said support member.

2. The mold of claim 1, wherein the shape of the upper surface of said support member is substantially the same as the three-dimensional shape of the resin mold part.

3. The mold of claim 1, wherein said resin mold part is formed of a photo-setting resin by laser stereolithography.

4. The mold of claim 1, wherein said support member is one of a metal body and a resin body, and each opening of said support member is one of an aperture and a channel which is formed in the upper surface of the support member, and which is open to the resin mold part.

5. The mold of claim 1, wherein said support member is of a porous structure and produced by binding coarse particles (3D) with a binder so that the voids of said porous structure are larger than said openings of the reticulate resin mold part.

6. The mold of claim 1, wherein said support member is of a porous structure and is produced by binding coarse particles by sintering them, and wherein the voids of said porous structure are larger than said openings of the reticulate resin mold part.

* * * * *